United States Patent [19]

Long

[11] Patent Number: 4,750,757
[45] Date of Patent: Jun. 14, 1988

[54] REAR AXLE TORQUE ROD DAMPER

[75] Inventor: Louis D. Long, Plymouth, Mich.

[73] Assignee: Chrysler Motors Corporation, Highland Park, Mich.

[21] Appl. No.: 78,146

[22] Filed: Jul. 27, 1987

[51] Int. Cl.⁴ .............................................. B60G 11/18
[52] U.S. Cl. ................................... 280/689; 248/74.2
[58] Field of Search ............. 280/665, 689, 692, 697, 280/723, 772; 248/49, 74.2

[56] References Cited

U.S. PATENT DOCUMENTS

| | | | |
|---|---|---|---|
| 3,324,853 | 6/1967 | Czorny et al. | 248/74.2 |
| 3,894,706 | 7/1975 | Mizusawa | 248/74.2 |
| 4,192,529 | 3/1980 | Shiratori et al. | 280/689 |
| 4,486,030 | 12/1984 | Takata et al. | 280/723 |
| 4,623,164 | 11/1986 | Cassel et al. | 280/689 |

FOREIGN PATENT DOCUMENTS 3019303  11/1981  Fed. Rep. of Germany ..... 248/74.2

*Primary Examiner*—Ross Weaver
*Attorney, Agent, or Firm*—Edward P. Barthel

[57] ABSTRACT

A damper member is disclosed for retaining a torsion rod within cross-beam inverted channel-shaped rear axle. The damper member is normally U-shaped in cross-section having an upwardly opening central bore defined by vertically extending leg portions and a base portion. Upon the damper member being compressed into a D-shaped clearance between the channel and the rod its section is transformed for a U-shape to a C-shape. The unique design of the damper member enables it to be lockingly retained under pressure in the D-shaped clearance.

2 Claims, 1 Drawing Sheet

REAR AXLE TORQUE ROD DAMPER

BACKGROUND OF THE INVENTION

This invention relates to a cross-beam rear axle assembly and more particularly to a press-in damper member for securing an intermediate portion of a torque rod disposed within a channel-shaped axle.

The U.S. Pat. No. 4,623,164 issued Nov. 18, 1986, to Cassel et al. discloses a band clamp for clamping a stabilizer bar to a cross-beam rear axle in a front wheel drive vehicle. As shown in the Cassel patent, the axle is a substantially rigid beam connected between trailing control arms which are pivotally mounted to the vehicle frame and carry the wheel spindle for the rear wheels. The stabilizer bar includes a torsion rod portion extending between the control arms adjacent the axle and having a crank arm at each end which is secured to the respective control arms. The control arms, and hence the wheels, are allowed to move somewhat independently by reason of torsional flexure of the stabilizer bar and of the axle. The torque transmitted by the stabilizer bar provides an anti-sway effect on the rear of the vehicle.

Prior art one-piece damper members for securing an intermediate portion of a torsion rod within a channel shaped axle are known. An example of one such a damper member is shown by the "prior art" FIG. 2 of the drawings. It will be noted that the damper member "a" of FIG. 2 has a circular through bore "b" provided with a vertical slit "c" on its underside. The damper "a" is adapted to be mounted on a rear axle torsion rod prior to the bar being fixedly located within the confines of its inverted channel axle. Thus, the slit "c" allows the damper member to be opened-up so as to surround the torsion bar located in its bore "b". Subsequently, the torsion rod and damper member are inserted in the channel-shaped axle and secured together as an assembly. It is desirable under certain assembly procedures to insert the damper member after the torsion bar is fixedly positioned within the confines of the channel shaped axle. It will be appreciated that such an assembly procedure is not feasible with the prior art damper member "a".

SUMMARY OF THE INVENTION

The present invention relates to an improved damper member for a cross-beam rear axle torsion bar of the type described above. A feature of the invention is to provide a one-piece elastomeric damper member that is insertable on the axle torsion rod after the rod has been fixedly secured within the confines of an inverted channel axle having limited clearance in the recess between the rod and the channel inner surface.

In the preferred form an improved damper member is provided having a generally U-shaped configuration in its unassembled relaxed mode. The damper member comprises a pair of upwardly extending leg portions interconnected by a base portion defining a semi-circular upwardly opening central bore sized to initially nest the torsion rod therein. The leg portions have side surfaces which are outwardly tapered at a predetermined acute angle from the vertical while each leg free upper end has an enlarged cone-section head element.

The axle member has an inverted channel-shaped section defined by an upper half-round bight wall portion terminating in opposed side wall portions. The torsion rod is coextensive with the axle member such that its principal axis located on the vertically disposed longitudinally extending plane of symmetry of the channel shaped section. The rod principal axis is positioned a predetermined distance below the center of curvature of the axle member half-round bight wall portion. A D-shaped recess or clearance is thus formed between the channel interior surface and the rod defining equally spaced mirror image side gaps having a predetermined dimension. An upper gap distance is centered on the axle vertical plane of symmetry having a dimension a predetermined amount greater than the dimension of the side gaps.

The damper member leg portions have each of their upper head elements inserted in an associated side gap of the D-shaped recess and compressed therethrough until the torsion rod is substantially surrounded by the damper member semicircular bore. The damper member cross-section is thus transformed from its initial U-shape to a C-shape with the damper member engaging substantially the entire inner wall surface of the channel-shaped axle. Further, each leg portion cone-sectioned head element, by virtue of being located in the recess upper gap, enables it to partially expand therein thereby positively locking the damper member in the D-shaped recess.

BRIEF DESCRIPTION OF THE DRAWINGS

Further features and advantage of the invention will become apparent to those skilled in the art upon reference to the following description and accompanying drawings in which.

DETAILED DESCRIPTION OF THE INVENTION

Figure 1:
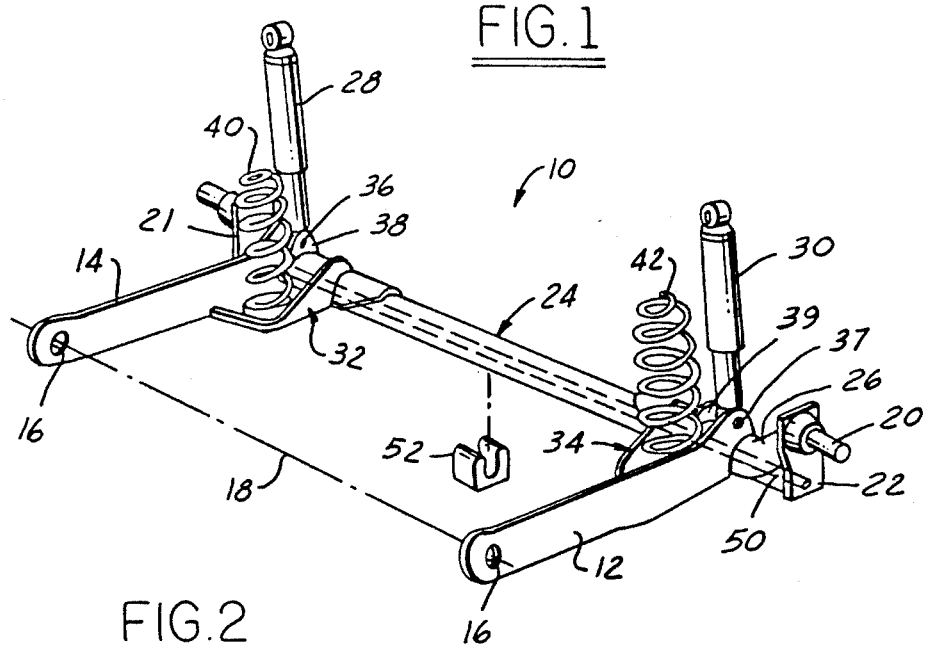
FIG. 1 is a perspective view of a vehicle cross-beam rear axle assembly incorporating the present invention.

Referring now to the drawings and in particular to FIG. 1, a rear suspension system is illustrated at 10 designed to be carried by a pair of longitudinally extending vehicle side rails (not shown) as depicted for example in U.S. Pat. No. 4,637,628 issued Jan. 20, 1987, to D. J. Perkins. The Perkins patent is assigned to the assignee of the present application the disclosure of which is incorporated by reference herein.

The suspension system 10 consists essentially of a pair of longitudinally extending trailing control arms 12 and 14, adapted to be pivotally connected at their forward ends to the vehicle side rails by suitable pivot bushings (not shown) located in holes 16. Thus, the control arms 12 and 14 undergo opposite pivotal movement about their transverse pivotal axis 18 in response to opposite vertical deflection of the rear road wheels (not shown). The wheels are adapted to be suitably attached by spindles 20 bolted to right and left mounting plates 21 and 22, respectively.

A transversely extending rear cross-beam axle member, generally indicated at 24, extends between the mounting plates 21 and 22. The axle member 24 has upturned ends 26 suitably affixed to the mounting plates, as by welding. A pair of right-and left shock absorber struts 28 and 30 of conventional design are interconnected between the motor vehicle body (not shown) and right and left spring mounting brackets 32 and 34. The brackets 32 and 34 are fixedly secured inwardly from their associated control arms 12 and 14 on the axle member 24. Pivot bolts 36 and 37 are shown connecting the lower end of each shock absorber 28, 30 intermediate its associated bracket inboard ears 38 and 39, respectively, and the aft end of its associated control arm. The brackets 32 and 34 each have a horizontal spring seat portion extending forwardly from the axle member 24 which support the lower end of its associated right and left coil springs 40 and 42, respectively. The frame side rails are each provided with an upper spring seat (not shown) so that the vehicle superstructure is resiliently supported relative to the road wheels.

Figure 4:
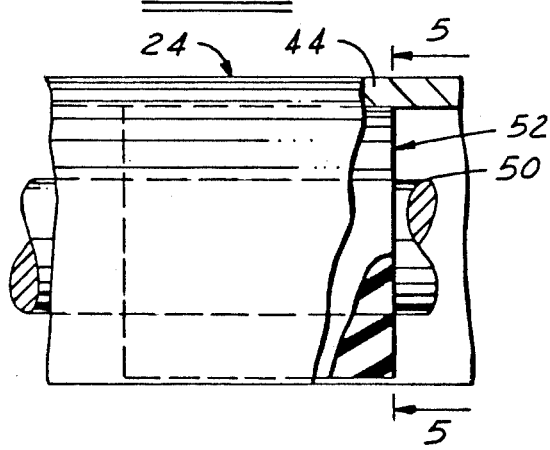
FIG. 4 is a fragmentary side elevational view of the inverted channel axle of FIG. 1 with parts broken away showing a damper member assembled therewith.
Figure 5:
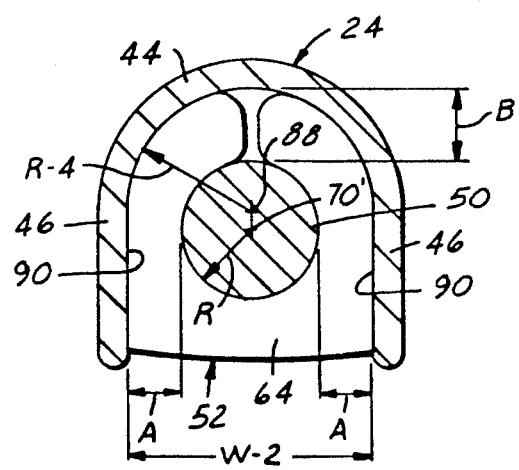
FIG. 5 is a sectional view taken substantially on the line 5—5 of FIG. 4.

As best seen in FIGS. 4 and 5 the cross-beam rear axle 24 is an inverted channel with a U-shape cross-section defined by an upper half-round bight wall portion 44 terminating in substantially vertically extending opposed side wall portions 46. A stabilizer bar or torsion rod shown at 50 in FIG. 1 extends between the control arms 12 and 14 with its free ends projecting through aligned holes in the side mounting plates 21 and 22, respectively, and fixedly secured therein by welds. As seen in FIG. 5 the torsion rod 50 having a predetermined radius "R" is disposed coextensive to and within the confines of the inverted channel axle 24. The rod 50 is held in substantially fixed relationship in the axle by the fixed ends and is secured at a central location by a damper member.

Figure 2:
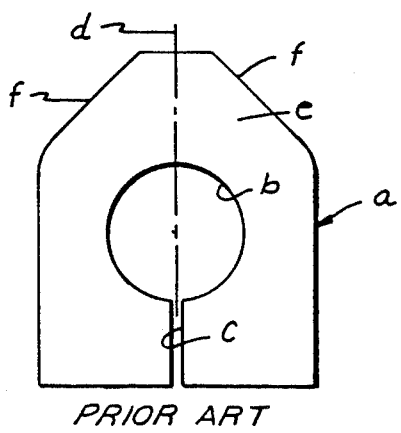
FIG. 2 is an end elevational view of an example of a prior art damper member.

A prior art damper member is shown at "a" in FIG. 2 formed of suitable elastomeric material such as rubber or plastic. The damper member "a" is generally block-shaped and formed with a central through bore "b". The damper member "a" has a slit "c" in the bore "b" aligned on the damper's vertically disposed longitudinally extending plane of symmetry indicated by dashed construction line "d". The slit "c" allows the damper member bore "b" to be opened up so as to completely surround a torsion rod. Thus, the damper member "a" is readily mounted on a torsion rod 50 prior to the rods assembly within the confines of an inverted channel axle 54. The prior art damper member "a" is formed with a frusto conical shaped upper portion "e" having chamfered sides "f". By virtue of its configuration, the damper member upper portion "e" is compressed so as to generally conform to the axle half-round bight wall portion 44. It will be appreciated that the prior art damper member "a" must be inserted on the torsion rod 50 prior to its location within the confines of the inverted channel axle 54.

Figure 3:
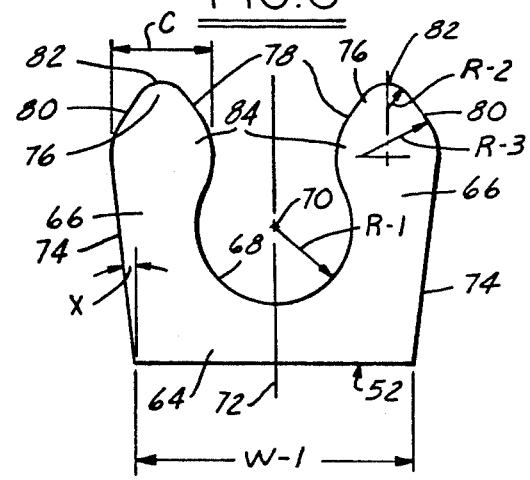
FIG. 3 is an end elevational view of the damper member of the present invention.

Turning now to FIG. 3, the damper member of the present invention has a generally U-shaped configuration defined by a base portion 64 and a pair of upstanding leg portions 66. The leg portions 66 together with the base portion 64 define a central semi-circular bore 68 having an upwardly directed opening. The bore 68 has a radius "R-1", a predetermined dimension less than the radius "R" of the rod 50, with its center located on bore axis 70. Further, the damper member base portion 64 has a dimension W-1, shown in FIG. 3, which is a predetermined dimension less than the internal width W-2 of the axle inverted channel shown in FIG. 5. It will be noted that damper member 52 is formed symmetrically about a vertically disposed longitudinally extending plane of symmetry defined by dashed construction line 72, which plane includes the semi-circular bore axis 70.

The damper member leg portions 66 each extend upwardly with their outer side surface portions 74 canted or inclined outwardly at an acute angle indicated at "X" in FIG. 3. Angle "X" is of the order of 10 degrees from the vertical. The leg portions 66 upper or distal ends define enlarged cone-sectioned head elements 76. Each head element 76 has inner 78 and outer 80 chamfered surface portion converging upwardly to a radiused lead-in edge surface portion 82 having a determined radius portion "R-2". The outer chamfered portions 80 are joined to the outer side surface portions 74 by predetermined radius portion R-3. The bore 68 upwardly directed opening is defined by opposed arcuate or convex shoulder elements 84 spaced predetermined horizontal distance defining the bore opening therebetween.

With reference to FIG. 5 it will be seen that the inverted channel axle 24 interior wall surface and the torsion rod perimeter define therebetween a generally D-shaped recess. It will be noted that the rod principal axis, indicated at 70', is positioned parallel to and a predetermined distance below the center of curvature of the rear axle upper bight wall portion 44 defined by radius "R-4". The radius R-4 is defined by its center located on an axis 88 and extending parallel to the axis 70'. Further, with the damper member 52 inserted in the D-shaped recess the damper member bore axis 70 substantially coincides with the principal axis 70' of the torsion rod.

FIG. 5 shows the D-shaped recess defining a pair of predetermined minimal side gaps, indicated by the dimensions "A", extending between the rod and the inner faces 90 of its associated side wall portions 46. Also, an upper recess gap, defined by dimension "B", is of a predetermined distance greater than the distance "A" of the recess side gaps.

The head element 76 of each damper leg sized to have a horizontal dimension "C" a predetermined distance greater than each side recess dimension "A" . Thus, upon each damper member leg portion head element 76 being squeezed into its associated side gap "A", the head element shoulders 84 will be compressed. As each shoulder 84 passes through its associated gap "A", it will partially spring outwardly so as to partially return to its normal unstressed state. By virtue of being located adjacent the upper gap, defined by dimension "B", enables each head element to partially expand providing a locking fit in the recess upper gap area.

To enable the placement of the damper member 52 in the D-shaped recess by means of a mechanical press operation without temporary distortion of the cross-beam axle it is necessary that it be coated with a heavy mineral oil fluid used for the assembly of rubber to metal parts. An example of one such heavy mineral oil fluid may be purchased under the Trade Name Circosol 4240, which is manufactured by the Sun Oil Company. Such a heavy mineral oil coating not only serves as a rubber to metal installation lubricant but, upon drying after installation of the damper member its residue provides a high coefficient of friction between the axle channel and the compressed damper member. Because of the resultant frictional resistance developed by the dried heavy mineral oil residue the damper member is frictionally held in locking retention in the D-shaped recess. Thus, by virtue of the damper member 52 being uniquely shaped and sized it is initially positively locked in the axle D-shaped clearance being maintained under compressive load. This compressive load, in turn, develops an additional frictional bond between the dried heavy mineral oil residue and the inner surface of the recess insuring the retention of the damper member in the recess.

The heavy mineral oil used in the present invention must conform to the following physical and chemical specifications:

|  |  | LABORATORY PROCEDURE ASTM |
| --- | --- | --- |
| API Gravity | 17 to 20 | D-1298 |
| Color, ASTM | Max. 4 | D-1500 |
| Flash Point, °C. (°F.) Min | 218 (425) | D-92 |
| Pour Point, °C. (°F.) | Max. −25(+5) | D-97 |
| Viscosity at 100° C., $mm_2$/s (cSt) | 16.5 to 19.0 (16.5 to 19.0) | D-445 |
| Neutralization Number | Max. 0.10 | D-974 |
| Aniline Point, °C. (°F.) | 76 to 82 (170 to 180) | D-611 |

Thus, because of the resultant pressure, vibration in the first and third bending modes of the torsion rod is greatly reduced while the second and fourth bending modes are unaffected. The largest bending amplitude, however, occurs in the first bending mode. As a result, installation of the single damper member at the midpoint of the axle substantially reduces bending stresses in the torque rod 50.

An example of one preferred damper installation has the following set of dimensions:

| W-1 = 45.0 mm | R = 12.5 mm |
| --- | --- |
| W-2 = 43.0 mm | R-1 = 11.0 mm |
| A = 9.0 mm | R-2 = 4.0 mm |
| B = 12.0 mm | R-3 = 12.0 mm |
| C = 16.0 mm | R-4 = 21.5 mm |

It is understood that the invention is not limited to the exact construction illustrated and described above but that various changes and modifications may be made without departing from the spirit and scope of the invention as defined in the following claims.

What is claimed is:

1. In combination with a vehicle cross-beam axle member is an inverted channel with a U-shaped cross-section defined by an upper half-round bight wall portion terminating in opposed side wall portions, a circular sectioned torsion rod coextensive with said axle member having its principal axis positioned in a vertically disposed longitudinally extending plane of symmetry of said axle member within the confines of said channel, said channel wall portion and said torsion rod defining a generally D-shaped recess therebetween, said rod principal axis positioned parallel to and a predetermined distance below the center of curvature of said axle upper bight wall portion, wherein said D-shaped recess has a pair of predetermined minimal side gaps between said rod and its associated side wall portions, and an upper recess gap in said plane of symmetry having a predetermined dimension greater than said recess side gaps, a resilient damper member of elastomer material adapted for insertion in said recess comprising:

a generally U-shaped damper member in its unassembled relaxed mode having a pair of upwardly extending leg portions interconnected by a base portion, said leg and base portions defining a semi-circular upwardly opening bore having its central axis included in a vertically disposed longitudinally extending plane of symmetry with said bore sized for initially nestingly receiving said torsion rod therein, said damper member in its relaxed mode having a planar base portion bottom surface and a pair of outwardly tapered leg portion side surfaces each oriented at a predetermined acute angle from the vertical, each said leg distal end having an enlarged cone-section head element, wherein upon said damper member upwardly opening semi-circular bore receiving said rod therein by virtue of each said leg portion head element inserted in said recess and compressed through an associated one of said side gaps, such that said damper member when compressively loaded within said recess having its cross-section transformed from a U-shape to a C-shape and wherein each said leg portion head element located in said upper gap enabling said elements to partially expand to their normal unstressed state so as to lockingly fit in said recess upper gap with said bore substantially surrounding said torsion rod in a compression fit manner.

2. The combination as set forth in claim 1, wherein said damper member being initially coated with a heavy mineral oil fluid lubricant such that said damper member being readily inserted in said recess without distortion of said cross-beam axle, and wherein upon said lubricant drying after installation of said damper member in said recess the residue of said lubricant providing a frictional bond between said damper member and said recess insuring the retention of said damper member therein.

* * * * *

Notice of Adverse Decision in Interference

In Interference No. 102,113, involving Patent No. 4,750,757, L. D. Long, REAR AXLE TORQUE ROD DAMPER, final judgment adverse to the patentee was rendered May 31, 1989, as to claims 1 and 2.

*[Official Gazette September 19, 1989.]*